(12) United States Patent
Kaikuranta et al.

(10) Patent No.: US 8,578,038 B2
(45) Date of Patent: *Nov. 5, 2013

(54) METHOD AND APPARATUS FOR PROVIDING ACCESS TO SOCIAL CONTENT

(75) Inventors: Terho Kaikuranta, Piispanristi (FI); Bror Svarfvar, Kaarina (FI)

(73) Assignee: Nokia Corporation, Espoo (FI)

( * ) Notice: Subject to any disclaimer, the term of this patent is extended or adjusted under 35 U.S.C. 154(b) by 240 days.

This patent is subject to a terminal disclaimer.

(21) Appl. No.: 12/627,332

(22) Filed: Nov. 30, 2009

(65) Prior Publication Data
US 2011/0131663 A1    Jun. 2, 2011

(51) Int. Cl.
*G06F 15/16*    (2006.01)

(52) U.S. Cl.
USPC ........................................................ 709/229

(58) Field of Classification Search
None
See application file for complete search history.

(56) References Cited

U.S. PATENT DOCUMENTS

| | | | |
|---|---|---|---|
| 6,636,968 B1 * | 10/2003 | Rosner et al. ................. | 713/178 |
| 6,993,587 B1 | 1/2006 | Basani et al. | |
| 7,603,411 B1 | 10/2009 | Davies et al. | |
| 7,734,710 B2 | 6/2010 | Seligmann et al. | |
| 7,765,305 B2 | 7/2010 | Smith et al. | |
| 7,835,689 B2 | 11/2010 | Goldberg et al. | |
| 7,865,137 B2 | 1/2011 | Goldberg et al. | |
| 7,904,423 B2 | 3/2011 | Vermeulen et al. | |
| 7,916,877 B2 | 3/2011 | Goldberg et al. | |
| 7,917,082 B2 | 3/2011 | Goldberg et al. | |
| 7,917,633 B1 | 3/2011 | Mendez et al. | |
| 8,185,497 B2 | 5/2012 | Vermeulen et al. | |
| 8,270,320 B2 | 9/2012 | Boyer et al. | |
| 8,285,825 B1 | 10/2012 | Nagaraj et al. | |
| 2006/0067250 A1 | 3/2006 | Boyer et al. | |
| 2006/0133407 A1 | 6/2006 | Kuisma | |
| 2006/0146765 A1 * | 7/2006 | Van De Sluis et al. ....... | 370/338 |
| 2007/0129006 A1 | 6/2007 | Goldberg et al. | |
| 2007/0133764 A1 | 6/2007 | Goldberg | |
| 2007/0226299 A1 * | 9/2007 | Shaffer et al. ................. | 709/206 |
| 2008/0070697 A1 | 3/2008 | Robinson et al. | |
| 2008/0086261 A1 | 4/2008 | Robinson et al. | |
| 2008/0086431 A1 | 4/2008 | Robinson et al. | |

(Continued)

FOREIGN PATENT DOCUMENTS

| | | |
|---|---|---|
| EP | 1 768 345 A2 | 3/2007 |
| WO | WO 2008/034145 A2 | 3/2008 |

OTHER PUBLICATIONS

Search Report and Written Opinion for International Application No. PCT/IB2010/055485, mailed Mar. 2, 2011; 13 pages.

(Continued)

*Primary Examiner* — Scott Christensen

(74) *Attorney, Agent, or Firm* — Alston & Bird LLP

(57) ABSTRACT

An apparatus for providing access to social content may include at least one processor and at least one memory including computer program code. The at least one memory and the computer program code may be configured to, with the at least one processor, cause the apparatus to perform at least receiving information providing corresponding identities of a plurality of members of a group, receiving an indication of group content including at least one content item stored in association with the group, and enabling access to the group content by the members based on presence information related to the members indicating that a presence threshold associated with the group content is met. A corresponding method and computer program product are also provided.

19 Claims, 6 Drawing Sheets

(56) References Cited

U.S. PATENT DOCUMENTS

2008/0086458 A1  4/2008  Robinson et al.
2008/0120590 A1  5/2008  Wang et al.
2008/0243933 A1  10/2008  Holtzman et al.
2009/0299200 A1  12/2009  Eggenberger et al.
2010/0205541 A1  8/2010  Rapaport et al.
2010/0226252 A1  9/2010  Gogic et al.
2012/0209998 A1  8/2012  Svarfvar et al.

OTHER PUBLICATIONS

International Search Report and Written Opinion from International Application No. PCT/FI2012/050067; mailed May 23, 2012.
Parr, B.; "*Google Wave: A Complete Guide*;" Mashable; dated May 28, 2009; retrieved on Jan. 21, 2013 from <http://mashable.com/2009/05/28/google-wave-guide/>.
Office Action for U.S. Appl. No. 13/025,826 dated Aug. 7, 2013.

* cited by examiner

METHOD AND APPARATUS FOR PROVIDING ACCESS TO SOCIAL CONTENT

TECHNOLOGICAL FIELD

Embodiments of the present invention relate generally to content sharing technology and, more particularly, relate to a method and apparatus for providing access to social content.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. One area in which there is a demand to increase ease of information transfer relates to the sharing of information between multiple devices and potentially between multiple users. In this regard, given the ability for modern electronic devices to create and modify content, and also to distribute or share content, it is not uncommon for users of such devices to become prolific users and producers of media content. Networks and services have been developed to enable users to move created content to various points within the networks.

Various applications and software have also been developed and continue to be developed in order to give the users robust capabilities to perform tasks, communicate, obtain information or services, entertain themselves, etc. in either fixed or mobile environments. Given the robust capabilities of mobile electronic devices and the relatively small size of such devices, it is becoming increasingly common for individuals to keep mobile electronic devices on or near their person on a nearly continuous basis. Moreover, because such devices are useful for work, play, leisure, entertainment, and other purposes, many users also interact with their devices on a frequent basis. Accordingly, whether interaction occurs via a mobile electronic device or a fixed electronic device (e.g., a personal computer (PC)), more and more people are interacting with friends, colleagues and acquaintances via online networks. This trend has led to the rise of a number of social networking applications that span the entire spectrum of human interaction from purely professional to purely leisure activities and everything in between.

Users of social networking applications often use the social network as a mechanism by which to distribute content to others. In some cases, content may be freely shared without any access restrictions. However, in other situations, content distribution may be limited to a specific set of other users, friends, or colleagues. Limiting access to content may sometimes be accomplished by employing user IDs and/or passwords that are manually entered when logging into a system or web site. Various types of digital rights management (DRM) techniques have also been developed, particularly for managing access to commercial content. However, it may be desirable to develop yet further mechanisms by which to enable access to content that is desirable for sharing under specific and/or controllable circumstances.

BRIEF SUMMARY

A method, apparatus and computer program product are therefore provided for enabling the provision of access to social content. In this regard, for example, some embodiments of the present invention may enable the employment of presence information regarding members of a social group as an enabling factor with respect to providing access to content. Furthermore, some embodiments may provide for an access model or paradigm in which virtual display of content is provided via a shared display including multiple separate devices that may be brought together to form the shared display.

In one example embodiment, a method of providing access to social content is provided. The method may include receiving information providing corresponding identities of a plurality of members of a group, receiving an indication of group content including at least one content item stored in association with the group, and enabling access to the group content by the members based on presence information related to the members indicating that a presence threshold associated with the group content is met.

In another example embodiment, a computer program product for providing access to social content is provided. The computer program product includes at least one computer-readable storage medium having computer-executable program code instructions stored therein. The computer-executable program code instructions may include program code instructions for receiving information providing corresponding identities of a plurality of members of a group, receiving an indication of group content including at least one content item stored in association with the group, and enabling access to the group content by the members based on presence information related to the members indicating that a presence threshold associated with the group content is met.

In another example embodiment, an apparatus for providing access to social content is provided. The apparatus may include at least one processor and at least one memory including computer program code. The at least one memory and the computer program code may be configured to, with the at least one processor, cause the apparatus to perform at least receiving information providing corresponding identities of a plurality of members of a group, receiving an indication of group content including at least one content item stored in association with the group, and enabling access to the group content by the members based on presence information related to the members indicating that a presence threshold associated with the group content is met.

Embodiments of the invention may provide a method, apparatus and computer program product for employment in network based content sharing environments. As a result, for example, individual device users may enjoy improved capabilities with respect to sharing content with a selected group of other device users.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
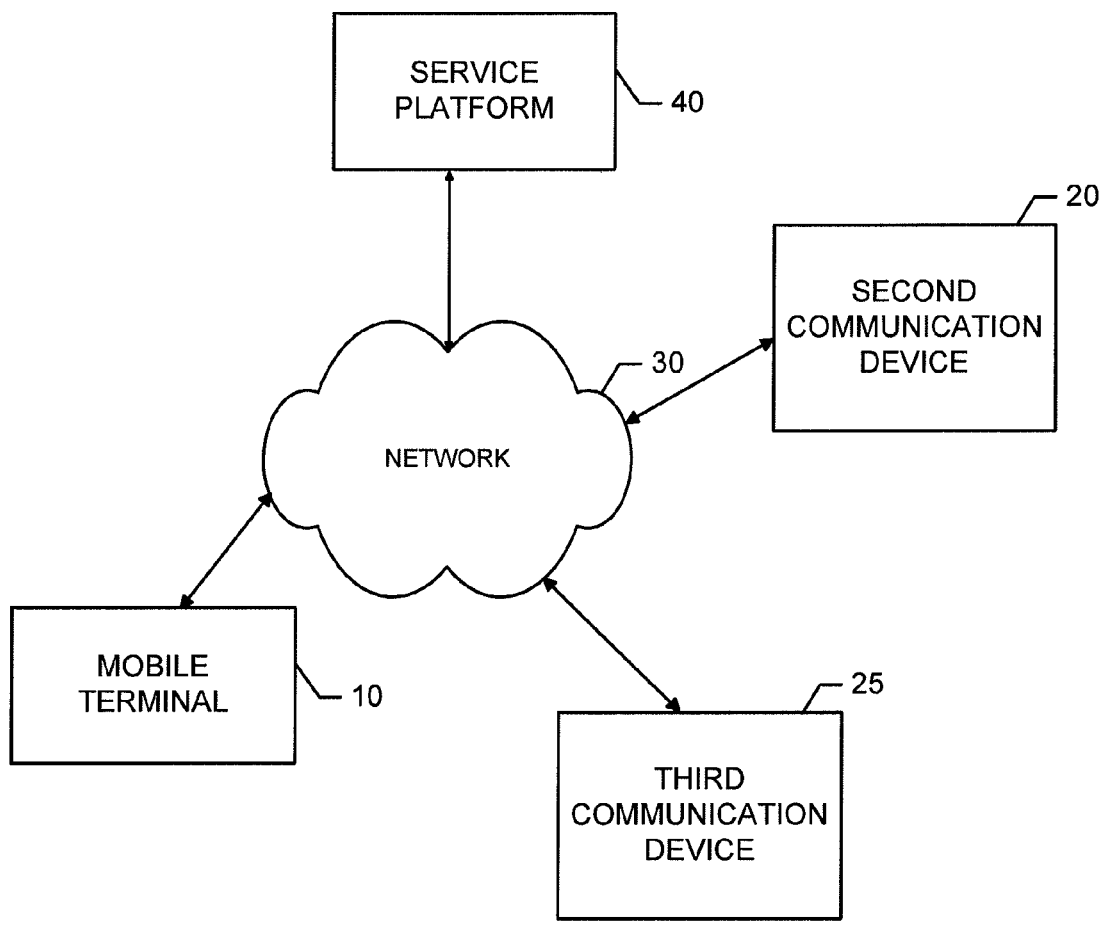
FIG. 1 is a schematic block diagram of a communication system according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a physical storage medium (e.g., volatile or non-volatile memory device), can be differentiated from a "computer-readable transmission medium," which refers to an electromagnetic signal.

Electronic devices have been rapidly developing in relation to their communication and content sharing capabilities. As the capabilities of such devices have increased, applications and services have grown to leverage the capabilities to provide increased utility and improved experience for users. Social networks and various services and functionalities supporting social networks are examples of mechanisms developed to leverage device and network capabilities to provide users with the ability to communicate and share content with others. However, content sharing in many environments may be limited to specific situations or sets of individuals on the basis of each individual providing personal authentication information (e.g., user ID and password). However, in some settings, it may be desirable to have the presence of members of a particular group be the determining factor for granting access to certain content.

Accordingly, some embodiments of the present invention may enable content access to be provided to members of a group on the basis of the presence of a predetermined number (or all) of the members of the group (e.g., a social networking group). The presence may be physical presence (e.g., proximity based) or may be presence at a particular site, service or on a network. Some embodiments may also provide for virtual display of content of a group folder or content item by enabling portions of the content to be distributed over the displays of a plurality of the devices of the group. Thus, for example, devices of the group may be arranged proximate to one another to provide a composite display comprised of each of the individual displayed moved together to form the composite display.

FIG. 1 illustrates a generic system diagram in which a device such as a mobile terminal 10, which may benefit from embodiments of the present invention, is shown in an exemplary communication environment. As shown in FIG. 1, an embodiment of a system in accordance with an example embodiment of the present invention may include a first communication device (e.g., mobile terminal 10) and a second communication device 20 capable of communication with each other via a network 30. In some cases, embodiments of the present invention may further include one or more network devices such as a service platform 40 with which the mobile terminal 10 (and possibly also the second communication device 20) may communicate to provide, request and/or receive information. Furthermore, in some cases, the mobile terminal 10 may be in communication with the second communication device 20 (e.g., a PC or another mobile terminal) and one or more additional communication devices (e.g., third communication device 25), which may also be either mobile or fixed communication devices.

The mobile terminal 10 may be any of multiple types of mobile communication and/or computing devices such as, for example, portable digital assistants (PDAs), pagers, mobile televisions, mobile telephones, gaming devices, laptop computers, cameras, camera phones, video recorders, audio/video player, radio, global positioning system (GPS) devices, ebook devices, or any combination of the aforementioned, and other types of voice and text communications devices, can readily employ embodiments of the present invention. The second and third communication devices 20 and 25 may be any of the above listed mobile communication devices or an example of a fixed communication device such as a PC or other computing device or communication terminal having a relatively fixed location and wired or wireless access to the network 30.

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. Alternatively, such devices may include communication interfaces supporting landline based or wired communication with the network 30. In turn, other devices such as processing elements (e.g., personal computers, server computers or the like) may be coupled to the mobile terminal 10 and/or the second and third communication devices 20 and 25 via the network 30. By directly or indirectly connecting the mobile terminal 10 and/or the second communication device 20 and other devices to the network 30, the mobile terminal 10 and/or the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In example embodiments, the first communication device (i.e., the mobile terminal 10) may be a mobile communication device such as, for example, a personal digital assistant (PDA), wireless telephone, mobile computing device, camera, video recorder, audio/video player, positioning device, game device, television device, radio device, ebook devices, or various other like device or combinations thereof. The second and third communication devices 20 and 25 may be mobile or fixed communication devices. Regardless of the form of instantiation of the devices involved, embodiments of the present invention may relate to the provision of access to content within a defined group of users and/or the devices of the users. The group may be predefined based on any of a number of ways that a particular group may be formed. In this regard, for example, invited members may accept invitations to join the group, applications may be submitted and accepted applicants may become group members, or a group membership manager may define a set of users to be members of a group. Thus, for example, group members could be part of a social network or may be associated with a particular service such as a service hosted by or associated with the service platform 40. Accordingly, it should be appreciated that, although FIG. 1 shows three example devices capable of communication, some embodiments may include groups like social networks with the potential for many more group members and corresponding devices. Thus, FIG. 1 should not be seen as being limiting in this regard.

In an example embodiment, the service platform 40 may be a device or node such as a server or other processing circuitry. The service platform 40 may have any number of functions or associations with various services. As such, for example, the service platform 40 may be a platform such as a dedicated server, backend server, or server bank associated with a particular information source, function or service. As such, the service platform 40 may represent one or more of a plurality of different services or information sources. The functionality of the service platform 40 may be provided by hardware and/or software components configured to operate in accordance with known techniques for the provision of information to users of communication devices, except as modified as described herein.

In an exemplary embodiment, the service platform 40 may provide, among other things, content management, content sharing, content acquisition and other services related to communication and media content. Nokia's Ovi suite is an example of a service provision mechanism that may be associated with the service platform 40. In some cases, the service platform 40 may include, be associated with, or otherwise be functional in connection with a content distributor 42. However, the content distributor 42 could alternatively be embodied at one or more of the mobile terminal 10 and/or the second and third communication devices 20 and 25. As such, for example, in some cases the network 30 could be an ad hoc, peer-to-peer (P2P) network in which the content distributor 42 is embodied in at least one of the devices forming the P2P network. In any case, as will be discussed in greater detail below, the content distributor 42 may manage the ability of group content to be accessed based on presence information related to members of the group. In this context, group content may be content that is stored with restrictions regarding access to the content. Moreover, the restrictions may be associated with membership in the group and the presence of group members. In some cases, the group content may be stored collectively on one or more of the devices that are associated with group members. However, in other cases, the group content may be stored in a central location or otherwise in a location accessible and manageable by the content distributor 42. Thus, for example, the group content may be stored at the service platform 40. As such, in some embodiments the service platform 40 (or another device hosting the content distributor 42) may provide functionality associated with enabling access to group content based on presence information regarding members of the group.

Figure 2:
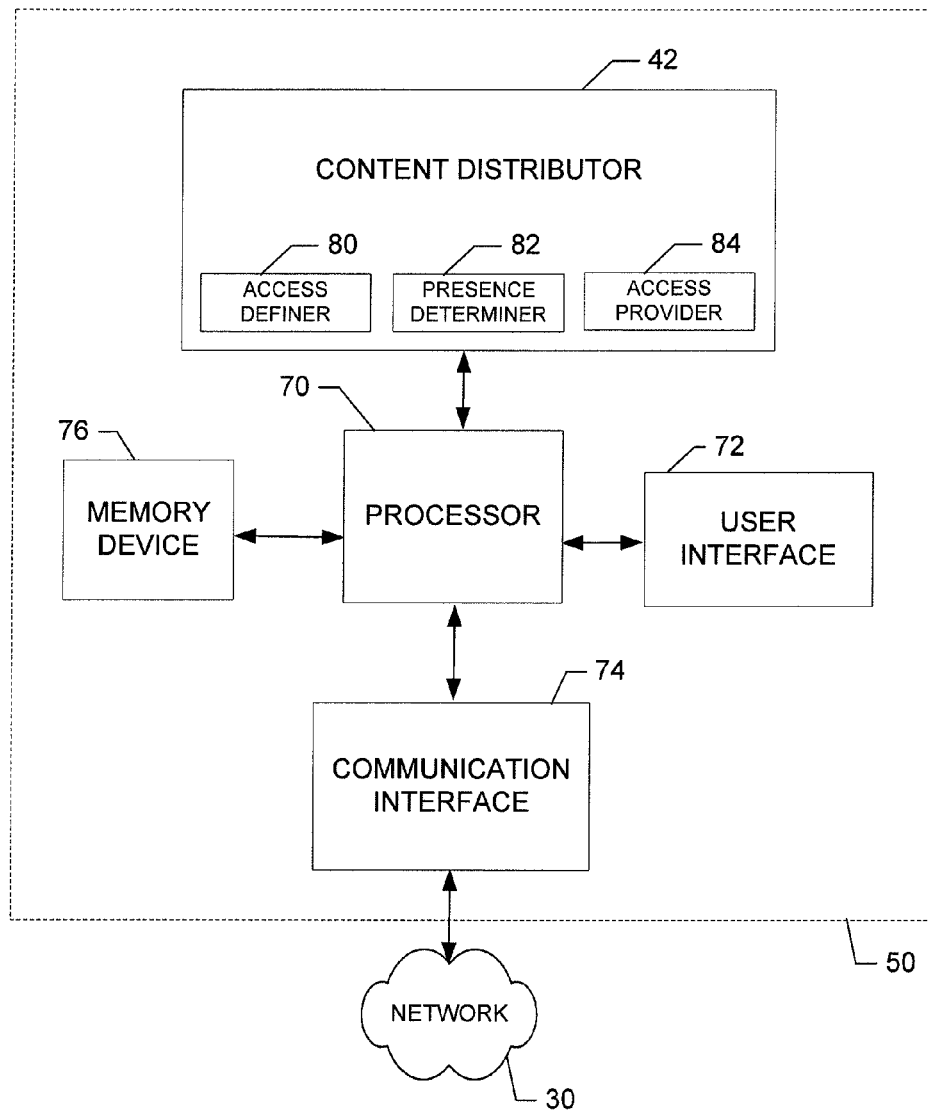
FIG. 2 is a schematic block diagram of an apparatus for providing access to social content according to an example embodiment of the present invention.

FIG. 2 illustrates a schematic block diagram of an apparatus for enabling the provision of access to social content according to an example embodiment of the present invention. An exemplary embodiment of the invention will now be described with reference to FIG. 2, in which certain elements of an apparatus 50 for providing access to social content are displayed. The apparatus 50 of FIG. 2 may be employed, for example, on a communication device (e.g., the mobile terminal 10 and/or the second or third communication devices 20 or 25) or a variety of other devices, both mobile and fixed (such as, for example, any of the devices listed above). Alternatively, embodiments may be employed on a combination of devices. Accordingly, some embodiments of the present invention may be embodied wholly at a single device (e.g., the mobile terminal 10) or by devices in a client/server relationship. Furthermore, it should be noted that the devices or elements described below may not be mandatory and thus some may be omitted in certain embodiments.

Referring now to FIG. 2, an apparatus 50 for providing access to social content is provided. The apparatus 50 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates or other structure configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70. In some embodiments, the memory device 76 may also or alternatively store content items (e.g., media content, documents, chat content, message data, videos, music, pictures and/or the like) comprising group content.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing embodiments of the present invention by further configuration of the processor 70 by instructions for performing the algorithms and/or operations described herein. In some cases, the processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an example embodiment in which the apparatus is embodied as a server or some other network devices, the user interface 72 may be limited, or eliminated. However, in an embodiment in which the apparatus is embodied as a communication device (e.g., the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, include or otherwise control the content distributor 42. In some cases, the content distributor 42 may include or control a group definer 80, a presence determiner 82, and an access provider 84. However, in other embodiments, the content distributor 42 may merely be in communication with the group definer 80, the presence determiner 82 and the access provider 84, and the group definer 80, the presence determiner 82 and the access provider 84 may each be controlled or embodied by the processor 70. The content distributor 42, the group definer 80, the presence determiner 82 and the access provider 84 may each be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the content distributor 42, the group definer 80, the presence determiner 82 and the access provider 84, respectively, as described below. Thus, in examples in which software is employed, a device or circuitry (e.g., the processor 70 in one example) executing the software forms the structure associated with such means.

In an example embodiment, the content distributor 42 may be configured to manage the provision of access to the group content associated with a particular group. In order to manage group content, the content distributor 42 may initially receive information defining the members of the group and defining the content to be protected (e.g., the group content). In some cases, the content distributor 42 may also be configured to provide tools or functionality to enable group definition. However, in alternative embodiments another entity (e.g., the group definer 80) may be configured to define the group, and the content distributor 42 may be enabled to receive information from the group definer to define the members of the group. As indicated above, the members of the group may be invitees, applicants, designees, or may otherwise be made members of the group by any suitable mechanism.

In some cases, the group definer 80 may be utilized by a particular user (e.g., a user of the mobile terminal 10 or the first or second communication device 20 or 25) to establish the group. As an example, the user may implement the group definer 80 to identify a list of identities of other users to be added to or invited to be added to the group. The list of identities may be manually entered, or may be selected from a contact list or address book of the user. Alternatively, the user may define specific criteria or characteristics of other users that are desirable for group membership. The group definer 80 may then examine information pertaining to a plurality of contacts or users associated with a service or an address book and provide invitations to or otherwise designate users that fit the specific criteria or characteristics as group members.

The group definer 80 may also be configured to enable one or more group members to define access policies for application by the access provider 84 as described in greater detail below. In this regard, for example, for content items designated as group content, the access provider 84 may apply access policies to determine whether to grant access to the corresponding group content. The group definer 80 may be used, either initially upon creation of the group, or during operation of the group, to define the policies to govern access to the group content. The policies themselves may range from simple to elaborate, but in an example embodiment may include at least a presence threshold. The presence threshold may be a minimum number of group members required to be present in order to enable access to group content by present members. Thus, for example, after a group is defined to include three members (e.g., a user of the mobile terminal 10, a user of the second communication device 20 and a user of the third communication device 25) via the group definer 80, the group definer 80 may be further utilized to define a presence threshold providing the minimum number of group members (e.g., two or even all three) that are to be present in order to permit any group member to access the group content.

In response to at least two group members being online or otherwise present at any given time, a session may be in progress. However, a group session with enablement for access by group members to group content may only be enabled in response to the simultaneous presence of a number of members sufficient to meet the presence threshold. In some embodiments, the group definer 80 may also be utilized to define who, if anyone, may make modifications to the access policies. As such, if access policy modifications are permitted, the presence threshold may be changed. In some cases, a sufficient number of members may be required to approve of policy changes. Accordingly, there need not necessarily be a group administrator since, in some embodiments, no one member alone may modify access policies or even group membership after group creation.

In an example embodiment, the content distributor 42 may reserve a portion of the memory device 76 (or another accessible storage medium) for storage of group content. The group content may be pre-existing content stored in association with the creation of the group. However, the group content may also be supplemented over time with additional submissions of content items either made by the members of the group or otherwise made available for group consumption. As yet another alternative, the group content may include the storage of transaction information, communication threads, content, or other media that may be created during an active group communication session. Combinations of the above mechanisms for creating group content, some of which may also include other types of content, may also be utilized for creation of the group content. The group content may include content items stored in folders, storage locations, web pages or other content sources capable of providing the group content to authorized members. Once the group content is stored or otherwise identified, the access provider 84 may take over the provision of access to the group content based on presence information related to the members of the group. In some cases, personal copies of group content may be prohibited. As such, group content may be "read only" content. However, in other cases, some content (e.g., content provided from the personal holdings of a group member) may be permitted to be duplicated by the person submitting such content originally. Some content may also be permitted to be copied by others under predefined and specific circumstances. Policies regarding specific content may be determined by the group on an individual basis or based on predefined group rules or agreed upon preferences.

The presence information utilized by the access provider 84 to determine whether to grant access to group content may be related to physical presence (e.g., group members being in the same or nearly the same physical location simultaneously) or virtual presence (e.g., potentially remotely located group members being present online at the same time). Thus, for example, in response to members that are physically remote from each other being each logged into the service platform 40 in association with a particular service (e.g., the Ovi suite), being in a particular chat room, having joined a particular P2P network, or being otherwise constructively "present" at the same time as other group members, the content distributor 42 may be configured to make access determinations with regard to the group content. Accordingly, in some embodiments, the access provider 84 may include a presence determiner 82.

The presence determiner 82 may be configured to track presence information for group members. As such, for example, the presence determiner 82 may monitor which group members log into or are otherwise online with respect to a service, network or application (e.g., a web application accessible via the Internet) associated with the group. In some cases, the presence determiner 82 may review position information for group members to determine whether the presence threshold is met for group members in a specific location. In yet other cases, such as cases in which a short range communication method is employed (e.g., Bluetooth), the presence determiner 82 may perform a scan of the environment to determine which and how many members are proximately located with respect to each other in order to determine whether the presence threshold is met. In still other situations, a telephone number (e.g., a conference call number) may be provided for members to call in and those that call in may be counted as being present. Accordingly, regardless of the method by which presence information is determined, the presence determiner 82 may be enabled to determine presence information defining the number of group members that are currently or simultaneously present. Presence information determined by the presence determiner 82 may be communicated to the content distributor 42 (in some cases via the access provider 84).

The access provider 84 may apply the access policies in order to compare the current situation to the access policies to determine whether to grant access to the group content. As such, for example, the access provider 84 may receive presence information from the presence determiner 82 and determine whether the presence threshold is met based on the number of group members present (e.g., physically or virtually).

In response to the presence threshold being met, the access provider 84 may enable access to all of the group content. As such, in some embodiments, all group content may be subject to a single set of globally applicable access policies so that, for example, if a quorum of group members is present (e.g., the number of group members present exceeds the presence threshold), then all group content is made available to the group members. However, if the number of group members is less than the presence threshold, then group content access is not granted.

As an alternative to the application of globally applicable access policies, content specific access policies may be applied. In this regard, for example, some content may have different access policies applicable thereto than other content. When content is initially stored as group content, the content may (e.g., by user preference or group preference) have specific requirements for presence criteria before access to such content may be enabled. For example, some content may have relatively low restrictions associated therewith such that a relatively low presence threshold may be met in order to enable access to such content (e.g., just a few members). However, other content may have relatively high restrictions associated therewith such that a relatively high presence threshold may be met in order to enable access to such content (e.g., a majority or even all of the members). In any case, the access provider 84 may manage the provision of access to group members based on presence information.

In some cases, an authentication code may be associated with the granting of access to the group content. However, the authentication code may be distributed amongst the group members and authentication of the group may be accomplished based on the aggregation of distributed portions of the authentication code. Accordingly, each group member may only be capable of providing his or her own respective portion of the authentication code. In such a scenario, the access provider 84 may be configured to accept portions of the authentication code from each respective member of the group and compile or otherwise combine the portions to determine whether the compiled or otherwise combined portions of the authentication code are sufficient to authenticate the group and enable access to the group content. The authentication code (or at least the portions thereof) may therefore correspond to the presence information for each respective member. Moreover, the authentication code may not need to be presented in full in order to enable access to the group content. Thus, for example, in situations where a session is attempted with less than all of the group members, the group members may be enabled to access the group content if an acceptable threshold portion of the authentication code is provided. As such, the acceptable threshold portion of the authentication code may correspond directly to the presence threshold. Accordingly, for example, if an 80% presence threshold were set such that on average four out of every five group members are required to be present in order to enable access to the group content, then if 80% of the authentication code could be aggregated based on the members present, the acceptable threshold portion of the authentication code may be met and access to the group content may be provided.

Once access is permitted to group content, the members of the group may thereafter be enabled to access the group content. Moreover, content may be distributed, created, modified, shared, experienced or otherwise handled by group members after access is granted. Activities associated with the handling of group content may be managed or controlled by the content distributor 42. Accordingly, embodiments of the present invention may provide a set of data or content items (e.g., the group content) that are permissibly accessed only when all or a predefined number or percentage of group members are present. Thus, for example, the group content may not be manipulated or handled without all or the predefined number or percentage of group members knowing about the manipulation or handling. Example situations in which this may be useful may include groups working with copyrighted content creation, handling of confidential or secret data, decision making forums or working groups, groups of friends or acquaintances. Thus, for example, embodiments may be employed in the context of providing and managing group licenses for materials such as copyrighted content like music, books or movies. Moreover, in some cases, the groups may be trying to avoid certain situations such as gossip or harmful misuse of information by requiring a quorum of members to be present before a session may be effectively undertaken with respect to group content.

In an example embodiment, multiple presence thresholds may be employed with corresponding different levels of access being associated with each respective presence threshold. In some cases, the presence thresholds may correspond to presence of respective different percentages of the total group membership. Thus, for example, if a relatively low or minimum threshold percentage of group members are present, a relatively low level of access may be granted. As each respective higher threshold percentage of group members is met, corresponding greater levels of access may be granted until, at a highest threshold percentage, full access is granted. As an example, if between 10% and 30% of group members are present, read only access may be provided for group content. However, if group membership presence falls between 30% and 70%, write access may additionally be enabled. Meanwhile, if 70% of group members are present, full access to read, write, modify, share, download, etc., may be granted. Other assignments with respect to the value and number of thresholds and corresponding levels of access granted may also be provided.

The content distributor 42 may be configured to enable user interface for group members with respect to accessible content. As such, the content distributor 42 may be responsible for providing automatically appearing inputs (e.g., soft keys or other software defined functional interface mechanisms to be shown on respective member device displays to indicate either that access rights are granted or that specific available interface options or functions are enabled with respect to accessible content. Thus, for example, options for sharing content, selecting specific views of content, chatting with online members, opening audio links, initiating a call, playing a video, or other commands may be presented to group members according to the applicability of such commands for the content and/or members to which such options pertain. In some cases, devices may be manufactured with specific keys for supporting functionality associated with embodiments of the present invention.

In some embodiments, the content distributor 42 may be configured to provide virtual display features with respect to a plurality of the group members. As such, for example, the content distributor 42 may be configured to push group content out to the display of member devices from the folder, storage location or web page providing the group content. However, in some embodiments, the content distributor 42 may be configured to split a content item into multiple parts and send each part to a respective one of the member devices.

In such an example, users of the respective member devices may be enabled to put their devices together in a specified arrangement in order to view or otherwise experience the complete content. The content distributor 42 may further provide instructions as to member device configuration so that the members may be instructed as to how to arrange their respective devices to best experience the complete content. In some embodiments, a symbol, number or other instructions may be provided on each display to assist in orientation of the respective devices.

Figure 3:
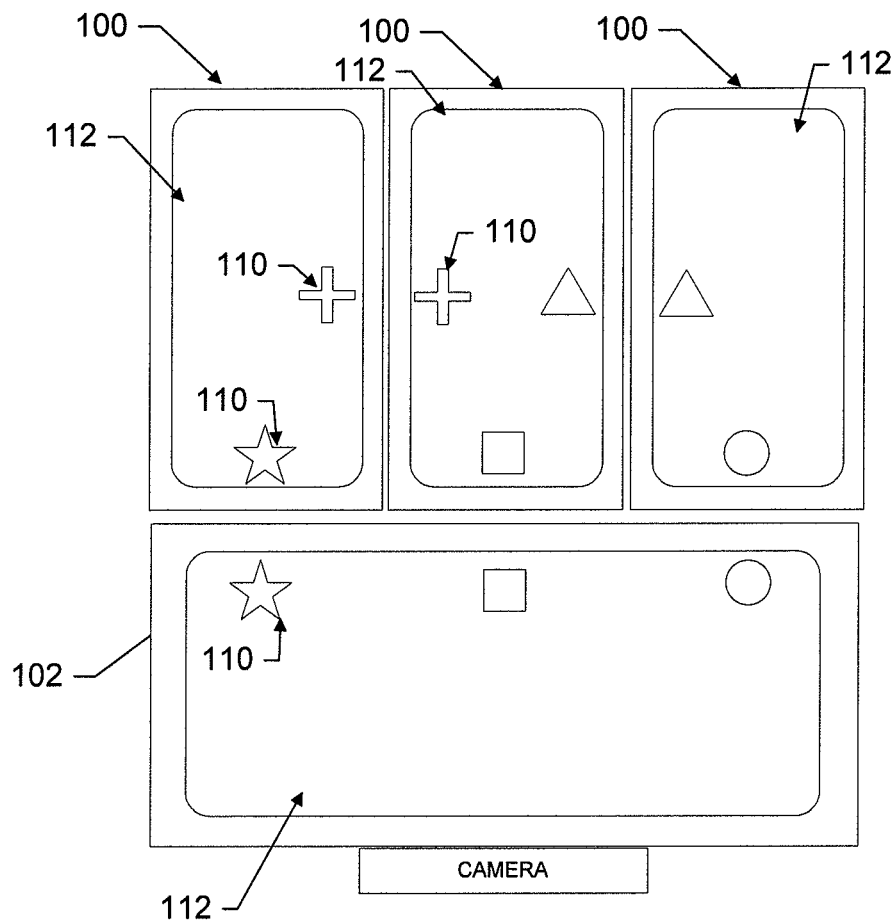
FIG. 3 illustrates an example in which various member devices are positioned relative to each other to enable the provision of a composite display using content splitting according to an example embodiment of the present invention.

FIG. 3 illustrates an example in which various member devices (including devices of different types and with different display characteristics) are positioned relative to each other to enable the provision of a composite display using content splitting as described above. As shown in FIG. 3, three smaller member devices 100 and one larger device 102 are positioned next to each other with corresponding symbols 110 on their respective displays 112. The symbols 110 can be matched up with the symbols displayed on other devices to provide for arrangement of the member devices in an expected configuration to correspond to the content splitting that is intended to be delivered by the content distributor 42. Since each device may have different display dimensions, in some embodiments, the content distributor 42 may have access to information descriptive of the display dimensions of the member devices. The descriptive information may be discoverable by the content distributor 42 based on indications of the type of device employed by each member or may be provided by group members when such members initially join or apply to join the group. Accordingly, dependent upon which member devices are proximate to each other in order to enable content splitting to be practiced, the content distributor 42 may be configured to determine a desirable or optimal display configuration to provide a composite display that is likely to be appealing or interesting. The content distributor 42 may then issue the symbols 110 to each respective display during a setup phase. In some cases, the symbols 110 may be presented until one or all of the member devices indicate a ready condition. After the ready condition is signaled, the symbols 110 may be removed from each display and content splitting may be practiced over the composite display created by the combination of each individual display of the member devices.

Figure 4A:
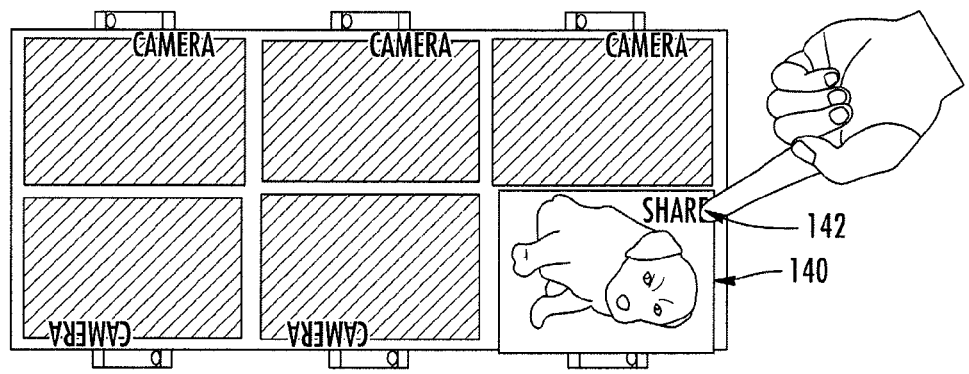
FIG. 4 illustrates the movement of content from one device to selected other devices according to an exemplary embodiment of the present invention.
Figure 4B:
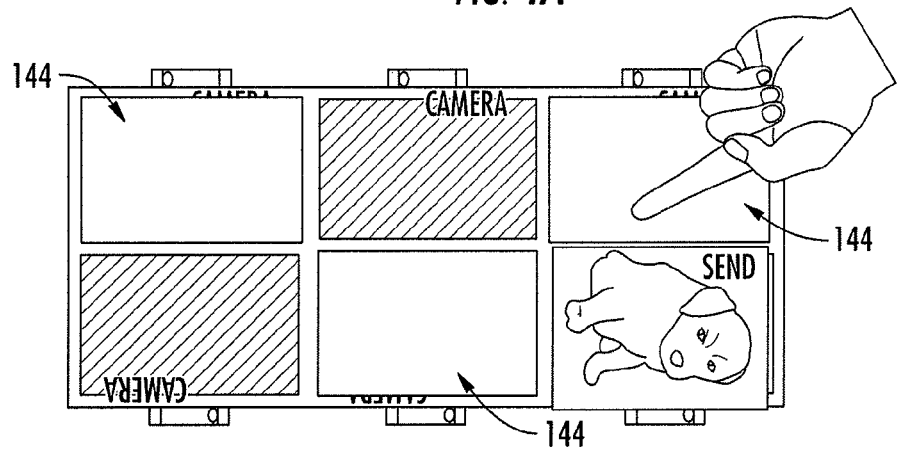
Figure 4C:
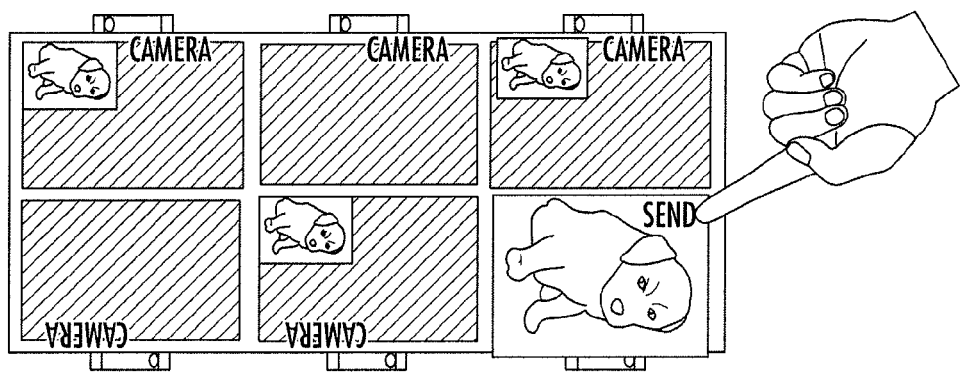

In some embodiments, all of the member devices need not be exactly next to each other to enabled content splitting. Thus, a seamless split of an image among all the member devices is not necessarily required. For example, one device may be used for providing input interface commands (e.g., acting as a remote keyboard or a remote controller) and therefore need not be located adjacent to the other devices in a predetermined pattern. However, the user interfaces of individual respective devices may also be used in some cases. For example, users may be enabled to drag and drop content anywhere on the composite display regardless of on which physical device a particular portion of the data is shown. In this regard, as shown on FIG. 4, which illustrates the movement of content from one device to selected other devices, various touch screen member devices may be positioned proximate to each other. FIG. 4, which includes FIGS. 4A, 4B and 4C shows the progression of selecting an image for sharing (FIG. 4A), selecting devices to which the selected image is to be shared (FIG. 4B), and copying of the selected image to the selected devices (FIG. 4C). As shown in FIG. 4A, a content item 140 on one device may be selected (e.g., via the select option 142) and corresponding other devices to which the content item 140 is desired for duplication may be selected (as indicated by the highlighted displays 144 of FIG. 4B) by pressing the touch screen of each respective recipient device. A copied content item may then be provided to each recipient device as shown in FIG. 4C.

In some embodiments, a member device may have data folders that can be automatically synchronized with all other member devices that are compatible. In such a situation, the member device having the data folder to be synchronized may simply be present with the other member devices and have the data folder designated as group content. When a group session is initiated (e.g., by reaching the presence threshold), the data folder content may be synchronized to the other member devices involved in the group session. As such, for example, music playlists, photos or other content that are intended to be shared with the group can automatically be shared when a group session is initiated. In some cases, a user may initiate (or attempt to initiate) a group session by sending an invitation to other members by calling other members, sending short message service (SMS) messages, email messages or messages associated with any other suitable communication mechanism. In other exemplary cases, a users desktop or a particular application view (e.g., facebook) may provide a list of groups to which the user belongs. An indication may also be provided for each group as to group status. Thus, for example, if presence information is determined regarding other members of one or more of the groups, an indication as to which groups have met the presence threshold may be provided so the user may be quickly able to appreciate which groups have active sessions. The indication may be an icon, bolded text or any other suitable indication. In some cases, further information on group status may be provided such as information indicative of a percentage of members present or information regarding proximity to the presence threshold. Thus, for example, the user may be able to appreciate that an active session may be initiated for a group if a particular number of invitations (e.g., sent as described above) are sent to and accepted by other group members.

For implementation of the content splitting embodiment, physical presence may be required in order to ensure that the members are physically near each other to enable the arrangement of their respective devices to implement a composite display of complete content that was split amongst the devices. As such, in some embodiments, the content distributor 42 may be configured to verify presence information and only provided content splitting signals to group members that are located proximately with respect to each other. The content splitting embodiment may be employed using parallel processing of the member devices for running applications in order to manage (e.g., optimize or minimize dependent upon the application) the use of resources and data traffic. As such, the content distributor 42 may coordinate operations of the member devices such that a portion of the devices are employed for image processing while another portion of the devices are employed for audio processing using onsite speakers. Moreover, users may each receive content directly from the service platform 40 (e.g., via the content distributor 42) or, in some cases, one device (e.g., a device with more bandwidth, better connection speed or cheaper connection costs) may receive the content directly from the service platform and distribute such content to the other member devices via a short range communication link such as WLAN, Bluetooth or the like. In other words, one device may act as a gateway device to provide a single connection point to the service platform 40 in order to save connection costs. In an example embodiment, the service platform 40 (or one of the member devices) may maintain a record or connection log to indicate the usage of the service in terms of time/date of connection, connection duration, and other indications related to access that may impact cumulative costs in order to enable group members to share or otherwise apportion costs as they deem appropriate.

As indicated above, one potential embodiment may be employed in connection with the provision and management of group licenses (e.g., for copyrighted content like music, movies, ebooks, games, pay television channels, etc.). In connection with these example embodiments, a group license may be a license to use content among group members (e.g., service users) by either one at a time or many at a time. In this regard, if employed in connection with a service associated with the service platform 40, the service platform 40 may control access to the content and how long such access is granted. Group licenses may therefore be used to control content use or moving/copying content between devices. A group license may also be used to control simultaneous content consumption among group members (e.g., service users) by controlling content activation for simultaneous consumption by multiple members of the group. Thus, for example, media consumption may be enhanced by knowing that your friend or friends are doing the same thing at the same time, thereby enhancing the social aspect of being part of the group. Additionally, one or more group members may act as the content director (or disk jockey) for providing content for other group members to experience together. Moreover, this role may be shared or rotated amongst different members of the group. The concept of a group license may also enable social purchasing. In other words, a group of users may pool resources to buy content that no individual one of them could afford to buy. For example, teenagers, individuals in developing countries, communities, clubs or other groups with common interests may keep costs down by purchasing one licensed copy for the group. If an embodiment of the present invention is provided in connection with a service associated with the service platform 40, the service platform 40 may provide or have access to an online store that may include various types of content and titles within each type to give group members the ability to select and purchase or otherwise acquire desirable content for group usage. In some cases, the service platform 40 (e.g., via the content distributor 42) may control the number of copies of content that may be used on a device at any given time. For example, some content may be licensed for a predetermined number of simultaneous users at any given time.

Figure 5:
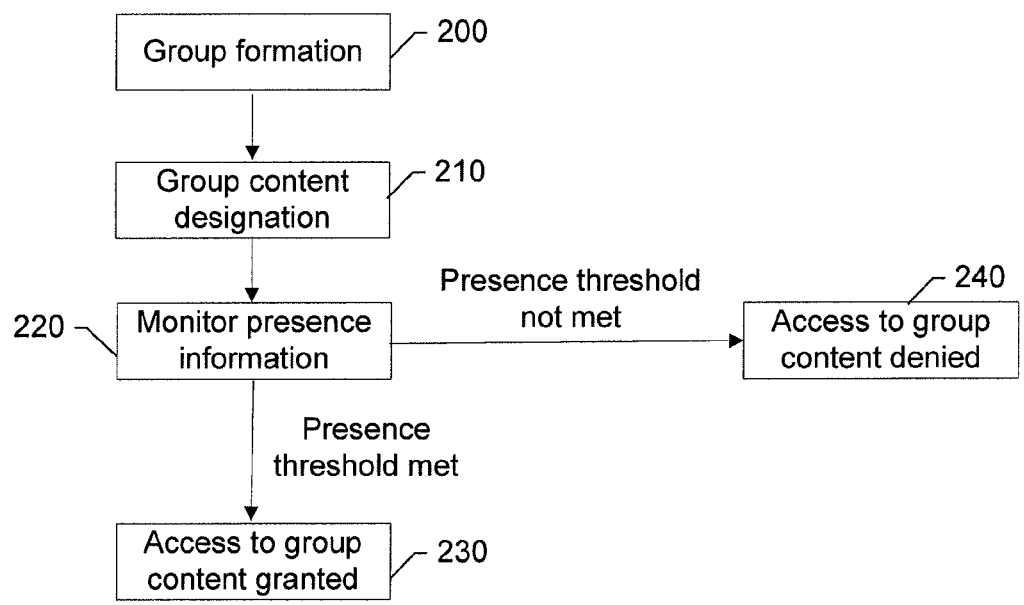
FIG. 5 illustrates a block diagram pertaining to activities associated with group formation and operation according to an exemplary embodiment of the present invention.

FIG. 5 illustrates a block diagram pertaining to activities associated with group formation and operation according to an exemplary embodiment. In this regard, at operation 200 a group may be formed. Group content may be designated at operation 210. During group formation and/or when group content is designated, access policies may be defined for the group content. At operation 220, presence information may be monitored. If the presence threshold is met, a group session may be initiated and access to the group content may be provided at operation 230. If the presence threshold is not met, access to group content may be denied at operation 240.

Accordingly, some embodiments of the present invention provide for the management of access to group content based on presence information associated with members of the group. Moreover, some embodiments of the present invention provide for an ability to split content among a plurality of devices to form a composite display. As a result, group members may be enabled to flexibly manage group costs and resources in relation to distributing content within the group.

Figure 6:
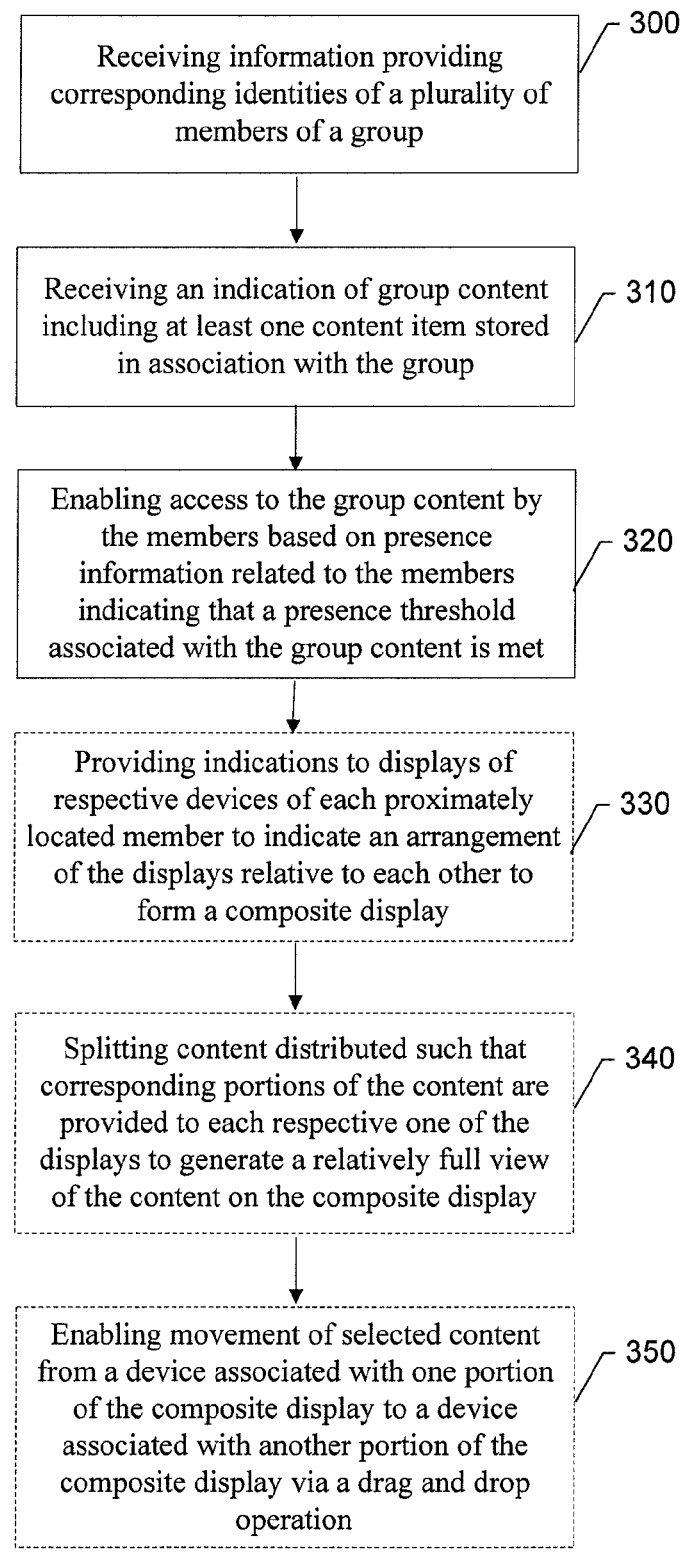
FIG. 6 is a block diagram according to an example method for providing access to social content according to an example embodiment of the present invention.

FIG. 6 is a flowchart of a method and program product according to example embodiments of the invention. It will be understood that each block or step of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or network device and executed by a processor in the mobile terminal or network device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 6, may include receiving information providing corresponding identities of a plurality of members of a group at operation 300. The method may further include receiving an indication of group content including at least one content item stored in association with the group at operation 310 and enabling access to the group content by the members based on presence information related to the members indicating that a presence threshold associated with the group content is met at operation 320.

In some embodiments, certain ones of the operations above may be modified or further amplified as described below. Moreover, in some situations, the operations described above may be augmented with additional optional operations (some examples of which are shown in FIG. 6 in dashed lines). It should be appreciated that each of the modifications, augmentations or amplifications below may be included with the operations above either alone or in combination with any others among the features described herein. In an example embodiment, the method may further include providing indications to displays of respective devices of each proximately located member to indicate an arrangement of the displays relative to each other to form a composite display at operation 330. In some cases, the method may further include splitting content distributed such that corresponding portions of the content are provided to each respective one of the displays to generate a relatively full view of the content on the composite display at operation 340. Alternatively or additionally, the method may further include enabling movement of selected content from a device associated with one portion of the composite display to a device associated with another portion of the composite display via a drag and drop operation at operation 350.

In some embodiments, enabling access may include enabling access to the group content based on the presence information indicating simultaneous virtual presence of a number of members at least meeting the presence threshold or based on the presence information indicating simultaneous physical presence of a number of members at least meeting the presence threshold proximately located with respect to each other. In some cases, each group member is assigned a respective portion of an authentication code and enabling access to the group content by the members based on presence information includes enabling access based on a determination as to whether a predetermined portion of the authentication code is received by aggregating authentication code portions from each member device indicating availability to participate in a group session. In an example embodiment, enabling access comprises enabling one member device to access the group content from a service platform such that the one member device is enabled to thereafter provide the accessed content to other member devices via a short range communication mechanism.

In an example embodiment, an apparatus for performing the method of FIG. 6 above may comprise a processor (e.g., the processor 70) configured to perform some or each of the operations (300-350) described above. The processor may, for example, be configured to perform the operations (300-350) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-350 may comprise, for example, the processor 70, or respective ones of the content distributor 42, the group definer 80, the presence determiner 82, the access provider 84, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:
1. An apparatus comprising:
at least one processor; and
at least one memory including computer program code, the at least one memory and the computer program code configured to, with the at least one processor, cause the apparatus to at least:

receive information providing corresponding identities of a plurality of members of a group, the information also providing presence information for the plurality of members of the group;
receive an indication of group content including at least one content item stored in association with the group, wherein access to the at least one content item is not individually accessible by any of the plurality of group members; and
enable access to the group content by each member of the plurality of members of the group only in an instance in which the presence information for the plurality of members of the group indicates that a sufficient number of members of the group are present such that a presence threshold is satisfied.

2. The apparatus of claim 1, wherein the at least one memory and the computer program code are further configured to, with the at least one processor, cause the apparatus to enable access to the group content based on the presence information indicating simultaneous virtual presence of a number of members at least meeting the presence threshold.

3. The apparatus of claim 1, wherein the at least one memory and the computer program code are further configured to, with the at least one processor, cause the apparatus to enable access to the group content based on the presence information indicating simultaneous physical presence of a number of members at least meeting the presence threshold proximately located with respect to each other.

4. The apparatus of claim 1, wherein the at least one memory and the computer program code are further configured to, with the at least one processor, cause the apparatus to provide indications to displays of respective devices of each proximately located member to indicate an arrangement of the displays relative to each other to form a composite display.

5. The apparatus of claim 4, wherein the at least one memory and the computer program code are further configured to, with the at least one processor, cause the apparatus to split content distributed such that corresponding portions of the content are provided to each respective one of the displays to generate a relatively full view of the content on the composite display.

6. The apparatus of claim 5, wherein the at least one memory and the computer program code are further configured to, with the at least one processor, cause the apparatus to enable movement of selected content from a device associated with one portion of the composite display to a device associated with another portion of the composite display via a drag and drop operation.

7. The apparatus of claim 1, wherein each group member is assigned a respective portion of an authentication code and wherein the at least one memory and the computer program code are further configured to, with the at least one processor, cause the apparatus to enable access based on a determination as to whether a predetermined portion of the authentication code is received by aggregating authentication code portions from each member device indicating availability to participate in a group session.

8. The apparatus of claim 1, wherein the at least one memory and the computer program code are further configured to, with the at least one processor, cause the apparatus to enable access by enabling one member device to access the group content from a service platform such that the one member device is enabled to thereafter provide the accessed content to other member devices via a short range communication mechanism.

9. The apparatus of claim 1, wherein the at least one memory and the computer program code are further configured to, with the at least one processor, cause the apparatus to enable increasing levels of access to the group content as respective increasing presence thresholds are met.

10. A method comprising:
receiving information providing corresponding identities of a plurality of members of a group, the information also providing presence information for the plurality of members of the group;
receiving an indication of group content including at least one content item stored in association with the group,
wherein access to the at least one content item is not individually accessible by any of the plurality of group members; and
enabling access to the group content by each member of the plurality of members of the group only in an instance in which the presence information for the plurality of members of the group indicates that a sufficient number of members of the group are present such that a presence threshold is satisfied.

11. The method of claim 10, wherein enabling access to the group content comprises enabling access to the group content based on the presence information indicating simultaneous virtual presence of a number of members at least meeting the presence threshold.

12. The method of claim 10, wherein enabling access to the group content comprises enabling access to the group content based on the presence information indicating simultaneous physical presence of a number of members at least meeting the presence threshold proximately located with respect to each other.

13. The method of claim 10, further comprising providing indications to displays of respective devices of each proximately located member to indicate an arrangement of the displays relative to each other to form a composite display.

14. The method of claim 13, further comprising splitting content distributed such that corresponding portions of the content are provided to each respective one of the displays to generate a relatively full view of the content on the composite display.

15. The method of claim 14, further comprising enabling movement of selected content from a device associated with one portion of the composite display to a device associated with another portion of the composite display via a drag and drop operation.

16. A computer program product comprising at least one computer-readable non-transitory storage medium having computer-executable program code instructions stored therein, the computer-executable program code instructions comprising:
program code instructions for receiving information providing corresponding identities of a plurality of members of a group, the information also providing presence information for the plurality of members of the group;
program code instructions for receiving an indication of group content including at least one content item stored in association with the group,
wherein access to the at least one content item is not individually accessible by any of the plurality of group members; and
program code instructions for enabling access to the group content by each member of the plurality of members of the group only in an instance in which the presence information for the plurality of members of the group indicates that a sufficient number of members of the group are present such that a presence threshold is satisfied.

17. The computer program product of claim 16, wherein program code instructions for enabling access to the group content include instructions for enabling access to the group content based on the presence information indicating simultaneous virtual presence of a number of members at least meeting the presence threshold.

18. The computer program product of claim 16, wherein program code instructions for enabling access to the group content include instructions for enabling access to the group content based on the presence information indicating simultaneous physical presence of a number of members at least meeting the presence threshold proximately located with respect to each other.

19. The computer program product of claim 16, further comprising program code instructions for providing indications to displays of respective devices of each proximately located member to indicate an arrangement of the displays relative to each other to form a composite display.

* * * * *